Jan. 29, 1946.  S. A. HOLMQVIST  2,393,775
DEVICE FOR MEASURING ALTERNATING CURRENTS
Filed Oct. 14, 1942

Inventor:
SETH A. HOLMQVIST
By Glascock Downing & Seebold
Attorneys.

Patented Jan. 29, 1946

2,393,775

UNITED STATES PATENT OFFICE 2,393,775

DEVICE FOR MEASURING ALTERNATING CURRENTS

Seth August Holmqvist, Gothenburg, Sweden, assignor to Telefonaktiebolaget L. M. Ericsson, Stockholm, Sweden, a company of Sweden Application October 14, 1942, Serial No. 462,031
In Sweden August 16, 1941

7 Claims. (Cl. 171—95)

The present invention relates to a device for measuring alternating current by means of one or more bridge circuits, which are passed by a part of the alternating current as well as by a direct current serving the purpose of bringing the bridge into equilibrium. The invention is based upon the use of a bridge circuit including a resistance, which changes with its temperature, as well as a number of constant resistances. Such a bridge circuit has the property that at a suitable choice of the resistances the voltage drop between the ends of the bridge will be zero only for a certain determined current intensity through the bridge circuit. If such a bridge circuit is traversed by direct current as well as by alternating current and the intensity of the direct current is known, the effective value of the alternating current can always be determined, if the "zero" current is known, independent of the frequency of the alternating current or the form of its curve. The device according to the invention is so constructed that it can be used for measuring current and voltage as well as the power of alternating currents. The invention is mainly characterized by the bridge circuit being connected with resistances in such a way that it can be connected to the alternating current circuit intended for measuring, either in series with a resistance for measuring the voltage or in parallel with another resistance for measuring the current intensity or in series with the former and in parallel with the latter for measuring the power.

Figure 1:
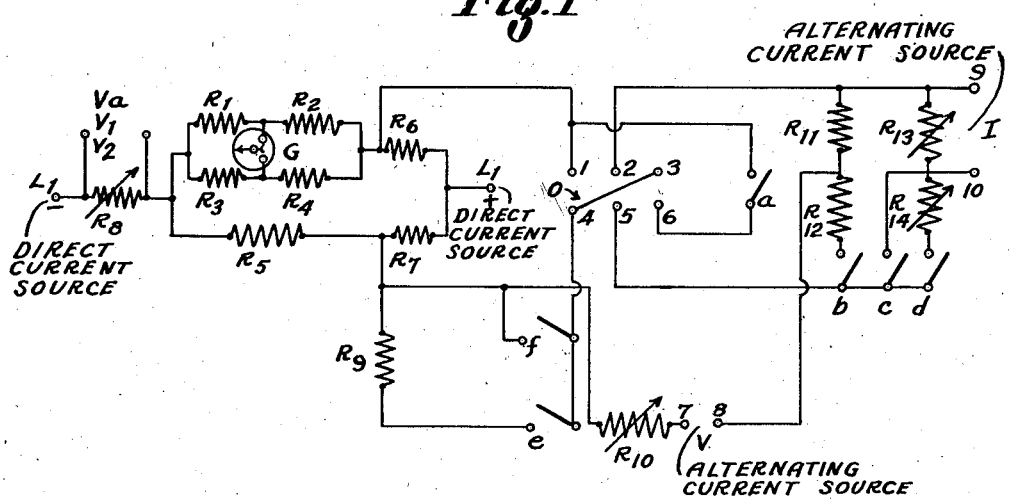

As an example, two devices according to the invention are schematically shown on the attached drawing. Fig. 1 is a switching diagram of a measuring device according to a performance of the invention including one bridge circuit, and Fig. 2 is a switching diagram of a measuring device according to the invention including double bridge circuits.

The bridge circuit included in the measuring device according to the figures is composed of four resistances $R_1$, $R_2$, $R_3$, $R_4$, of which $R_1$, $R_3$ and $R_4$ are constant and made of manganine wire, for instance, while the resistance $R_2$ changes with the temperature and, for instance, is composed of a thin wire with a high coefficient of temperature, for instance, a platinum wire. If a current is passed through both branches of the bridge circuit, it is evident that the galvanometer G indicates zero if $R_1:R_3=R_2:R_4$. Since $R_1$, $R_3$ and $R_4$ are constant and the resistance in $R_2$ is dependent on its temperature and consequently of the effective value of the resultant current through $R_2$, the galvanometer will indicate zero only for a certain current through the bridge circuit, the "zero" current. The bridge circuit is connected in series with a resistance $R_6$, and the bridge circuit as well as this resistance are connected in parallel with two resistances $R_5$ and $R_7$ in a D. C. circuit $L_1$—$L_1$, which also includes a resistance $R_8$, over which the D. C. in the circuit $L_1$—$L_1$ can be measured. The corresponding resistances included in the second bridge circuit according to Fig. 2 have been designated $R_1{}^1$—$R_8{}^1$.

In the device according to Fig. 1 the contact 1 in the two pole change-over switch O and one pole of a single pole switch $a$ are connected at a point between the bridge arm $R_1$—$R_4$ and the resistance $R_6$. The contacts 3 and 4 of the switch O are joined together and connected to one pole each of two single pole switches $f$ and $e$. The other pole of the switch $f$ is directly connected between the resistances $R_5$ and $R_7$, while the other pole of the switch $e$ is connected with the same point between the resistances $R_5$ and $R_7$ over a resistance $R_9$. The switch O is of the two pole change-over type which when thrown to the left connects the contacts 2 and 5 with the contacts 1 and 4 and when thrown to the right connects the contacts 2 and 5 with the contacts 3 and 6. A terminal 7 is connected to the second mentioned pole of the switch $f$ over a short-circuiting resistance $R_{10}$, which is suitably adjustable to its capacity for different measuring ranges. Another terminal 8 is connected between two resistances $R_{11}$ and $R_{12}$, of which the former is connected to a contact 2 in the switch O as well as to a terminal 9, while the resistance $R_{12}$ is connected to the one contact in a switch $b$, the second contact of which is connected to a contact 5 in the switch situated opposite the contact 2. The contact 6 in this switch is connected with the switch $a$. Between the terminal 9 and a terminal 10 a shunt resistance $R_{13}$ is connected and the terminal 10 can be direct connected to contact 5 over a switch $c$ as well as over a resistance $R_{14}$ to the same contact over a switch $d$. The resistances $R_{13}$ and $R_{14}$ should suitably be adjustable for different measuring ranges.

Figure 2:
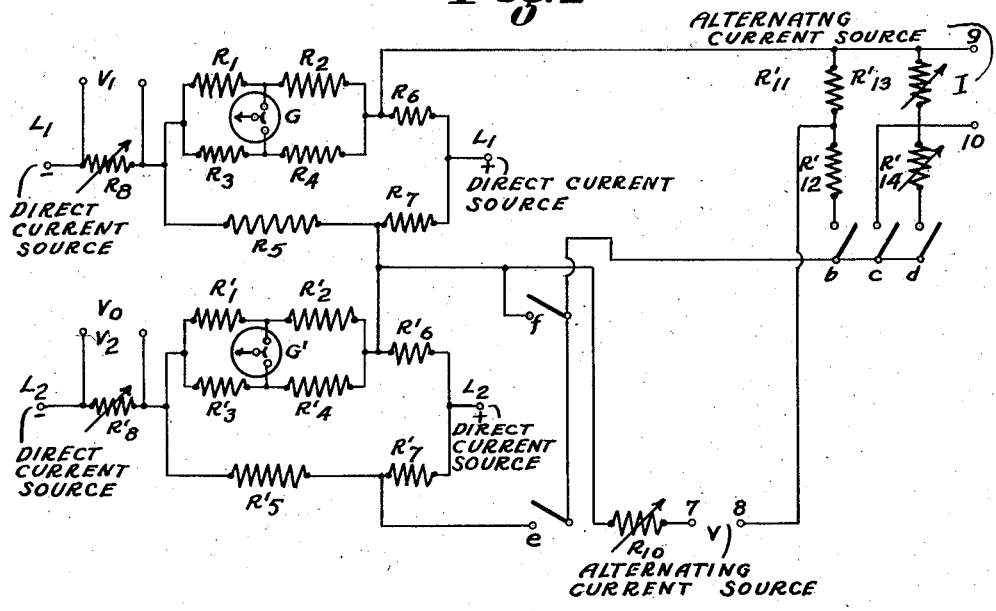

The device according to Fig. 2 differs from that in Fig. 1 by the resistance $R_9$ being replaced by another direct current circuit $L_2$—$L_2$ including the resistances $R_1{}^1$—$R_8{}^1$ in the same connection as the resistances $R_1$—$R_8$ in the circuit $L_1$—$L_1$ and further by the elimination of the change over switch O and the switch $a$.

When the devices described above are to be used, the "zero" current of the bridge circuit is at first determined, i. e., the current at which the galvanometer G does not give any deviation. At this current intensity the voltage $V_0$ is measured over the resistance $R_8$, respectively $R_8^1$, from which the "zero" current is obtained. Under this condition no alternating current is applied at 9—10 or 7—8.

When the device according to Fig. 1 is to be used for measuring a voltage, the desired alternating current voltage V is connected between the terminals 7 and 8 and the switch is thrown to the left connecting contacts 2 and 5 with contacts 1 and 4, whereupon the direct current in the circuit $L_1$—$L_1$ is so adjusted that the galvanometer G again indicates zero. Over the resistance $R_8$ the direct current required for bringing the bridge into equilibrium can be read by measuring the voltage $V_1$. The desired effective value $V_e$ of the alternating current voltage is then obtained according to the formula $$V_e = K \cdot \sqrt{V_0^2 - V_1^2}$$

where K is a constant depending on $R_{10}$.

When measuring alternating current intensities with the device according to Fig. 1 the alternating current is connected to the terminals 9 and 10, whereupon the contacts c and f are closed and the switch O thrown into the left position. In parallel with the resistance $R_{13}$ a circuit is then closed over the switch c, contact 5, contact 4, switch f, bridge circuit, contact 1, contact 2 to terminal 9. The direct current in the circuit $L_1$—$L_1$ is then adjusted, so that the galvanometer G indicates zero, determining the voltage $V_1$ over $R_8$. The desired effective value $I_e$ of the alternating current is obtained according to the formula $$I_e = C \cdot \sqrt{V_0^2 - V_1^2}$$

where C is a constant depending on $R_{13}$.

The determination of active alternating current power can be carried out with the device shown partly by means of different current and voltage circuit (supervision of power and energy meters) partly by a common power source (the measuring of the power consumption of a device).

When measuring the power with the help of separate current and voltage circuits, alternating voltage and current are connected to the terminals 7, 8, and 9, 10. The switches a, b, c, and e are closed and the switch O is thrown to the left. When the direct current through $L_1$—$L_1$ has been adjusted, so that the galvanometer G indicates zero, the direct current voltage $V_1$ over $R_8$ is measured. Switch O is then thrown to the right and the direct current through $L_1$—$L_1$ is again adjusted so that the galvanometer G indicates zero, whereby the direct current voltage $V_2$ then existing is measured over $R_8$. For the calculation of the active power IV cos $\varphi$ is then obtained:

$$P = K \cdot C (V_1^2 - V_2^2) \text{ watt active power}$$

where K and C are constants, which are only depending on $R_{10}$ and $R_{13}$.

For a direct measure of the power, the power consuming instrument is connected between the terminals 7 and 9 and the power supply to the terminals 7 and 10. Consequently, the resistance $R_{13}$ is connected in series with the power consuming instrument and the bridge is connected in parallel to said instrument. The switches a, d and e are closed, and the switch O is thrown to the left, the D. C. through $L_1$—$L_1$ is adjusted so that the galvanometer G indicates zero, the voltage $V_1$ is measured. The switch O is then thrown to the right, the D. C. through $L_1$—$L_1$ again adjusted so that the galvanometer G indicates zero, and the voltage $V_2$ is measured, whereupon the power consumed by the instrument is calculated in the same way as described above.

When using the measuring device according to Fig. 2 for measuring current or voltage, $V_1$ is, for instance, measured over $R_8$ and $V_0$ over $R_8^1$. When measuring the power, $V_1$ is measured over the resistance $R_8$ at the one bridge circuit and $V_2$ over the resistance $R_8^1$ at the other. The D. C. circuits $L_1$—$L_1$ and $L_2$—$L_2$ are adjusted for the same zero current. The desired values of the alternating current are obtained in the same way as described above, but the handling of the device will be somewhat simpler and the measuring results in certain cases more exact.

The performances of the invention described above and shown on the drawing are only to be considered as examples, and the details of the invention can be modified in different manners within the limits of the patent claims. The switch O shown in Fig. 1 can thus possibly be replaced by a switch inserted in the voltage circuit, serving the purpose of changing the phase angle for the voltage instead of the current 180° when measuring the power. With the device according to Fig. 2 the connection for measuring the power can be made in such a way that the alternating voltage will have the same phase position in both bridge circuits but that instead the phase angle for the alternating current will be changed 180° in the different bridge circuits.

I claim:

1. In an alternating current meter, first and second bridges, the first bridge forming part of the second bridge and including a resistance element varying in value in dependence upon the temperature thereof, a direct current source connected with two opposed points of said second bridge, means for varying the direct current intensity for balancing the two bridges, means for indicating the balance of the two bridges, first and second resistances connected together in series and connected in parallel to two other opposed points of the second bridge, a third resistance connected at one end with the one of the two second mentioned opposed bridge points with which the second resistance is connected, and means for changing the connections of the first resistance.

2. In an alternating current meter, first and second bridges, the first bridge forming part of the second bridge and including a resistance element varying in value in dependence upon the temperature thereof, a direct current source connected with two opposed points of said second bridge, means for varying the direct current intensity for balancing the two bridges, means for indicating the balance of the two bridges, first and second resistances connected together in series and connected in parallel to two other opposed points of the second bridge, a third resistance connected at one end with the one of the two second mentioned opposed bridge points with which the second resistance is connected, first and second terminals, the first terminal being connected with the opposite end of the third resistance and the second terminal being connected with the mid point of the first resistance, and means for changing the connections of said two terminals.

3. In an alternating current meter, first and second bridges, the first bridge forming part of the second bridge and including a resistance element varying in value in dependence upon the temperature thereof, a direct current source connected with two opposed points of said second bridge, means for varying the direct current intensity for balancing the two bridges, means for indicating the balance of the two bridges, first, second and third resistances connected together in series and connected in parallel to two other opposed points of the second bridge, a fourth resistance connected at one end with the one of the two second mentioned opposed bridge points with which the third resistance is connected, and means for changing the connections from the first and second resistances to said third resistance and said second bridge, respectively.

4. An alternating current meter as claimed in claim 1 wherein means is provided for connecting the two second mentioned opposed bridge points to an alternating current circuit either in series with the third resistance for measuring the voltage of said alternating current circuit or in parallel with said first resistance for measuring the alternating current intensity, or in series with the third resistance and at the same time in parallel with a series containing two equal resistances and said second resistance for measuring the power passing said alternating current circuit.

5. An alternating current meter as claimed in claim 2 wherein means is provided for connecting the two second mentioned opposed bridge points to an alternating current circuit either in series with the third resistance for measuring the voltage of said alternating current circuit or in parallel with said first resistance for measuring the alternating current intensity, or in series with the third resistance and at the same time in parallel with a series containing two equal resistances and said second resistance for measuring the power passing said alternating current circuit.

6. In an alternating current meter, two first and two second bridges, each first bridge forming part of one of the second bridges, each first bridge including a resistance element varying in value in dependence upon the temperature thereof, two direct current sources each connected with two opposed points of one of the second bridges, means for varying the direct current for balancing the four bridges, means for indicating the balance of the bridges, means connecting two other opposed points of the two second bridges in series, a first resistance connected in parallel to the second mentioned points, and a second resistance connected to the connecting point between the second mentioned bridge points.

7. In an alternating current meter, two first and two second bridges, each first bridge forming part of one of the second bridges, each first bridge including a resistance element varying in value in dependence upon the temperature thereof, two direct current sources each connected with two opposed points of one of the second bridges, means for varying the direct current for balancing the four bridges, means for indicating the balance of the bridges, means connecting two other opposed points of the two second bridges in series, first and second resistances connected together in series and connected in parallel to the second bridge points, and a third resistance connected to the connecting point between the second mentioned bridge points.

SETH AUGUST HOLMQVIST.